May 14, 1963

R. JOHNSON 3,089,990

POSITION SENSOR

Filed Dec. 6, 1960

INVENTOR
RALPH JOHNSON
BY C. A. Weigel
ATTORNEY

May 14, 1963   R. JOHNSON   3,089,990
POSITION SENSOR
Filed Dec. 6, 1960   2 Sheets-Sheet 2
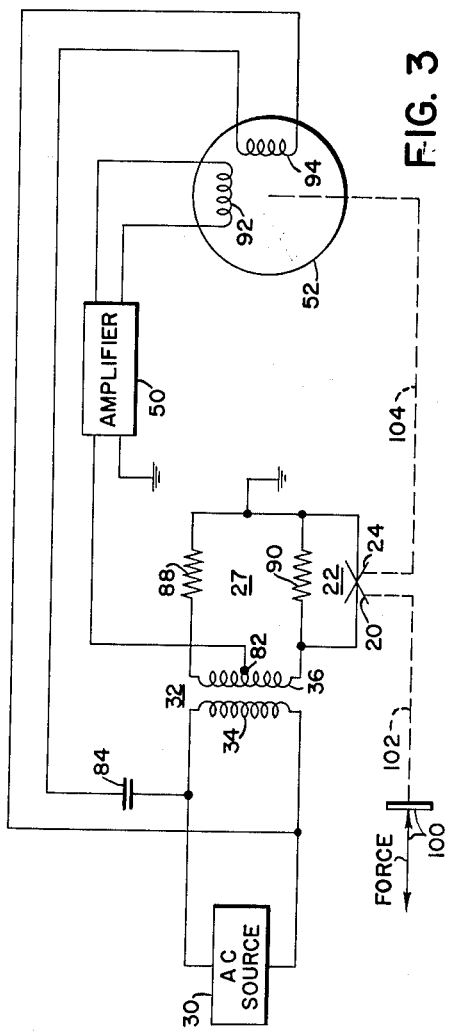
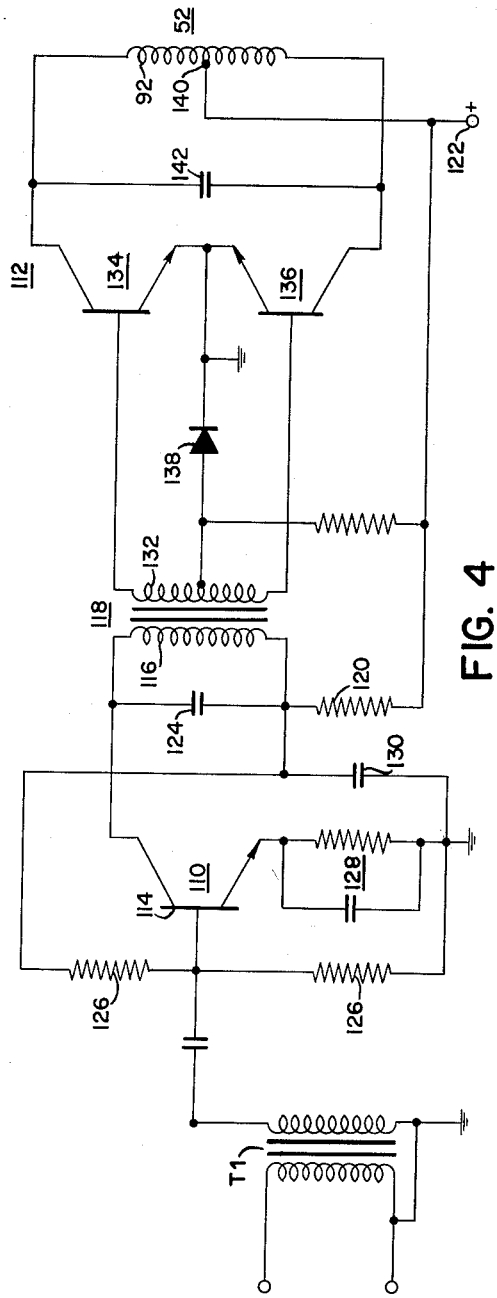
INVENTOR
RALPH JOHNSON
BY C. A. Weigel
ATTORNEY

United States Patent Office 3,089,990
Patented May 14, 1963

3,089,990
POSITION SENSOR
Ralph Johnson, Los Angeles, Calif., assignor, by mesne assignments, to Tamar Electronics, Inc., Gardena, Calif., a corporation of California
Filed Dec. 6, 1960, Ser. No. 74,088
13 Claims. (Cl. 318—29)

This invention relates to a physical position or displacement sensor and, more particularly, to a servo transducer capable of accurately and rapidly sensing the displacement of a mechanical input element. A preferred embodiment of this invention is characterized by low mass-loading of the mechanical input element and by relatively high sensitivity.

Heretofore, servo transducers have, in general, utilized some type of pickoff to provide an electrical signal indicative of the physical position or displacement of a mechanical input element. The mechanical input element may be, for example, a pressure diaphragm. The pickoff, which may be a variable resistor, usually is included as part of a bridge network which controls a servo motor connected through a gear train to re-position the pickoff contact in such a direction and to such a position to enable the pickoff impedance to rebalance the bridge. Unfortunately, most pickoffs cause an undesirable mass-loading of the mechanical input element. Such mass-loading tends to reduce the accuracy and sensitivity of the servo transducer.

A Patent No. 2,505,258 issued April 25, 1950, to W. C. Robinette describes a sensitive type servo transducer which uses the resistance of a pair of contacts to reduce the mass-loading effect. In describing the operation of his system, Robinette states that he takes advantage of a portion of the contact pressure-resistance curve having a substantially infinite slope whereby an exceedingly wide range of resistance may be covered by an extremely minute range of pressure so microscopic as to produce a change in contact of but a few molecules. Robinette suggests that the operation of the contacts should be maintained on this infinite slope portion of the contact pressure-resistance curve such that the contact resistance may vary in actual case from one-hundred thousand ohms to five million ohms. While such system apparently provides satisfactory results, it has several disadvantages. Among these are instability of the servo system due to a relatively large range of resistance variation in this region of operation on the steep part of the contact pressure-resistance curve. Further, to operate on this steep portion of the contact pressure-resistance curve, the several arms of the bridge must have a relatively high impedance. Such high impedance tends to reduce the output power that is available to the input of the servo amplifier. Further, such high impedances that are in series and in parallel with the contacts can result in large amounts of undesired noise being introduced to the input of the servo amplifier.

It is therefore an object of this invention to obviate the disadvantages of the prior art servo transducers.

Another object of this invention is to provide an improved transducer capable of accurately providing an output signal that is a function of the position of a mechanical input element without the attendant disadvantages of the prior art.

In a preferred embodiment of this invention, an improved transducer uses an extremely sensitive pickoff comprised of two contacts of high conductive metal. The contacts form one leg or arm of a bridge network excited by an alternating current signal. A small variation of contact pressure causes a change in contact resistance sufficiently large to reverse the phase of the output of the bridge. The arms of the bridge circuit are chosen such that the bridge is balanced and has no output for some relatively low value of contact resistance desirably below 1000 ohms. For values of contact resistance greater and lesser than the balanced value, the bridge provides phase and paraphase output error signals.

The advantage of this circuit over the prior art circuits, which operated substantially exclusively in the high resistance region, is that it operates both with lower values of and over a smaller range of contact resistance. Operating in such region results in a more stable servo transducer. Also, the use of low impedances in the bridge circuit tends to reduce high frequency noise that may be generated by the system.

Further advantages and features of this invention will become apparent upon consideration of the following description read in conjunction with the drawings wherein:

FIGURE 3 is a schematic diagram of an alternative bridge circuit in accordance with another embodiment of this invention; and FIGURE 4 is a schematic circuit diagram of an amplifier that may be used in the systems of FIG. 1 and FIG. 3.

Figure 1:
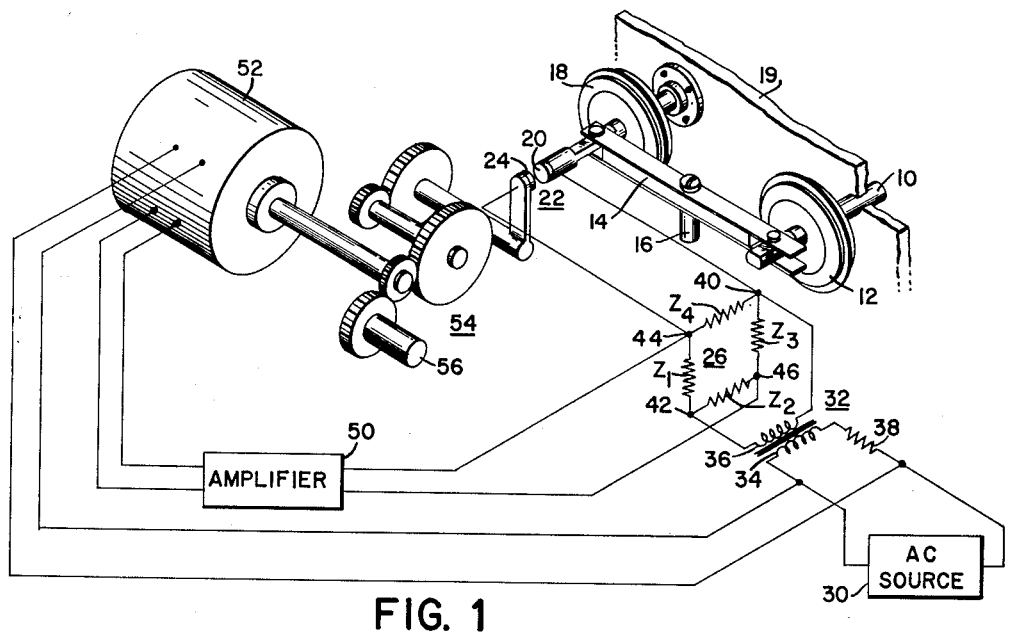
FIGURE 1 is a part schematic, part block and part isometric drawing of a typical pressure transducer system utilizing the subject invention.

The novel transducer of this invention is described and illustrated in the drawing of FIG. 1 as forming a part of a pressure transducer. It is understood, of course, that the novel servo transducer of this invention has many other applications. For example, the servo transducer may sense gyro displacement or acceleration displacement as well as the position or displacement of other mechanical elements.

In FIG. 1, the input pressure to be sensed, for example, that of the atmosphere, is coupled through a static pressure line 10 to a first pressure bellows 12. The first pressure bellows 12 is coupled mechanically to a rocker arm 14 which is adjustably pivoted at its center on a pivot 16. The other end of the rocker arm 14 is mechanically coupled to an evacuated bellows 18 which is fixedly mounted to a case 19. Also, mechanically coupled to the rocker arm 14 is one contact 20 (the driven contact) of the impedance pickoff 22. A second contact 24 (the follow-up contact) completes the impedance pickoff 22. One or both of the contacts 20, 22 may be the surface of a cam. In any event, each of the contacts 20, 22 may be those typically associated with conventional relays, etc.

The impedance pickoff 22 forms one leg in a bridge circuit 26. The bridge circuit 26 functions in a well-known manner, as will be described below, as a phase shift circuit, and includes four arms, three of which are designated by the impedances $Z_1$, $Z_2$, $Z_3$ respectively. In accordance with the invention, the fourth arm constitutes the variable arm of the bridge circuit and includes the impedance pickoff 22 paralleled by a fourth impedance designated $Z_4$. A source of alternating current voltage 30 is coupled through a resistor 38 to the primary 34 of a transformer 32 having a secondary 36. The secondary 36 is coupled to the input terminals 40 and 42, respectively, of the bridge 26. The output from the bridge 26 taken from the opposite output terminals 44 and 46, respectively, is coupled to the input of a conventional servo amplifier 50. The output of the servo amplifier 50 is connected to one of the two phase windings 92 (FIG. 3) of a reversible servo motor 52. The other phase winding 94 (FIG. 3) of the servo motor 52 is connected directly to the source of alternating current voltage 30. The servo motor 52 operates through a gear train 54 to reposition the follow-up contact 24 against the driven contact 20 thereby to re-balance the bridge 26. Also connected to be driven by the gear train 54 is a transducer output shaft 56 to which a needle, other indicator, or output device (not shown) may be connected.

As the pressure from the static pressure line 10 varies, the pressure between the contacts 20, 24 comprising the impedance pickoff 22 is slightly altered due to displacement of the pressure diaphragms 12 and 18. When this change in contact pressure occurs a corresponding change occurs in contact resistance and the balance of the bridge 26 is upset. Thus, upset, an error signal is generated at the output terminals 44, 46, respectively, of the bridge 26. The error signal is amplified by the servo amplifier 50 and used to drive the servo motor 52. The phase of the error signal is such that the servo motor 52 drives the impedance pickoff contact 24 in such a direction and to such a position such that the impedance between the contacts 20, 24 of the impedance pickoff 22 re-balances the bridge. Thus re-balanced, the bridge is said to be at null and the rotational angle of the servo motor 52, as indicated by the transducer output shaft 56, is proportional to diaphragm displacement. Since the diaphragm displacement is proportional to air pressure, the rotational angle of the servo motor 52 is also proportional to the air pressure.

Before considering the details of the operation of the bridge network, let us consider the characteristics of the impedance pickoff 22. At closure, the resistance across the contacts 20, 24 is normally less than one ohm (essentially zero). When the contacts 20, 24 become separated, the resistance across the contacts rises to that of open circuit (approaching infinity). This relationship is illustrated perhaps more clearly by considering the curve 60 of FIG. 2 in which the relative resistance of the contacts 20, 24 is plotted as the ordinate and the relative displacement of the contacts is plotted as the abscissa.

Thus, at the position approaching the point of zero displacement between the contacts, illustrated by the point 62 on curve 60, it may be noted that the resistance across the contacts 20, 24 is relatively low (typically in the order of one ohm). It has been discovered that the relative displacement between the contacts first increases, the contacts resistance varies linearly until the point 61 is reached, after which the contact resistance rapidly approaches infinity as illustrated by the dotted line 63.

In accordance with one embodiment of the invention, the impedances $Z_1$ through $Z_4$, inclusive, are selected such that variation of the contact displacement over the linear portion of the curve 60 which lies between the points 61 and 62 is sufficient to upset the balance of the bridge 26. In this region of operation, the contact resistance may typically be made to vary between approximately 0 ohms and 20 ohms. Thus, the impedances $Z_2$ and $Z_3$ which form one side of the bridge 26 are selected to have relatively low values, say in the order of 7 ohms each. The $Z_1$ arm of the bridge also is selected to have a relatively low resistance, preferably less than 10 ohms. In a typical case, a 5 ohm resistor may form the $Z_1$ arm of the bridge 26. The remaining arm of the bridge is formed by the impedance pickoff 22 which may vary between zero and infinity. To further limit the effect of this resistance variation to the linear portion 61—62 of its characteristic curve 60, the impedance $Z_4$, which typically may be 10 ohms, is connected in parallel across the impedance pickoff 22.

When an excitation voltage from the source 30 is applied to the bridge input terminals 40, 42, respectively, the amplitude and phase of the voltage at the bridge output terminals 44, 46, respectively, is dependent upon whether the impedance of the $Z_1$ arm of the bridge is larger, equal to or smaller than the impedance of the impedance pickoff 22 in parallel with $Z_4$. When the impedance of the impedance pickoff 22 and $Z_4$ in parallel is larger, the bridge 26 is unbalanced and the voltage available at the output terminals 44, 46, respectively, is in phase with the reference excitation. On the other hand, when the impedance of the impedance pickoff 22 and $Z_4$ in parallel is smaller, the voltage available at the output terminals 44, 46 of the bridge 26 is 180° out of phase with the reference voltage and provides directional sensitivity for the servo loop. In the third case, when the impedance of the impedance pickoff 22 and $Z_4$ in parallel equals that of the $Z_1$ arm of the bridge 26, the bridge is in balance and no error signal is supplied to the servo amplifier 50.

Figure 2:
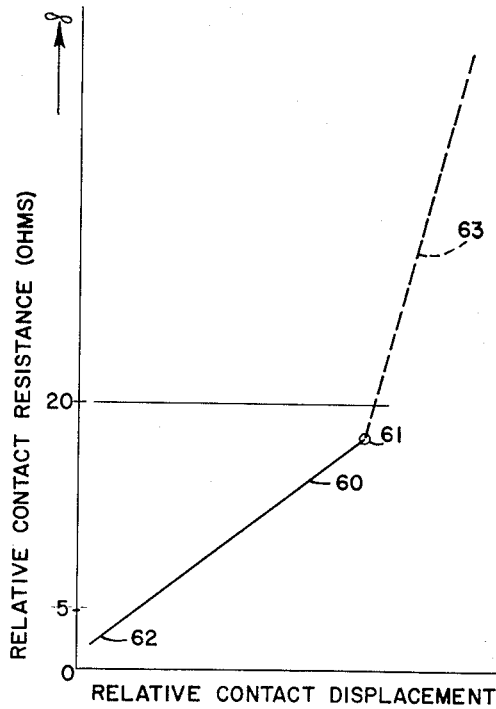
FIGURE 2 is a graph illustrating the relationship between contact resistance, plotted as the ordinate, and contact displacement, plotted as the abscissa, for typical contacts utilized in the system of FIG. 1.

Using these relatively low values for the arms of the bridge 26 results in the bridge having a null condition when the impedance pickoff 22 presents a resistance of approximately 10 ohms (in parallel with 10 ohms of $Z_4$ which results in a 5 ohm impedance for this arm of the bridge 26). Such operation has many advantages. Among these are that the system has a more stable operation because the impedance pickoff 22 operates in a relatively linear region 61—62 of its characteristic curve 60 (FIG. 2). The low values of the resistance that are placed in series and in parallel with the contacts of the impedance pickoff 22 reduce high frequency noise that is generated by the pickoff circuitry and amplified by the amplifier 50. Finally, the contact servo operation is such, due to operation on the low impedance-pressure part of the curve 60 (FIG. 2), that the magnitude of variation of contact pressure necessary to create servo motor action is quite small. This results in a higher sensitivity and lower mass-loading of the input element whose position is being sensed than the prior art techniques.

As an additional feature of this invention, the use of the resistor 38 at the input to the primary 34 of the transformer 32 results in a phase shift in a voltage applied to the servo amplifier 50 and has the advantage of eliminating the requirement for a phase shift capacitor that normally is coupled to the input of the winding coupled to the A.C. source 30. The phase shift generated is a result of choosing the resistor 38 to be large compared to the inductive reactance of the transformer 32. This causes the current applied to the bridge circuit 26 at the input terminals 40, 42 to be substantially in phase with the applied voltage. Since the voltage generated in the secondary 36 of the transformer 32 is proportional to the time rate of change of flux magnitude and since the flux magnitude is directly proportional (in phase) to the current in the primary winding 34, the generated voltage in the secondary 36 is proportional to the time rate of change of the applied voltage. Further, since the applied voltage rate of change is at a maximum at the points of 0 voltage, the phase of the voltage applied to the input terminals 40, 42 of the bridge 26 is delayed 90° behind the phase of the voltage from the source 30. This 90° phase shift eliminates the need for the capacitor normally employed at the input to the reference windings of the servo motor 52.

An alternative embodiment of the invention is shown in FIG. 3. In FIG. 3, elements similar to those illustrated in FIG. 1 have been given the same reference numerals and will not again be described in detail. Thus, the alternating current source 30 supplies the primary winding 34 of the transformer 32 by a direct connection.

The phase shift resistor 38 (FIG. 1) need not be used. Instead, a phase shift capacitor 84 is placed in series with the reference winding 94 of the servo motor 52. In the embodiment of FIG. 3, the transformer 32 has a secondary winding 36 which is center tapped at the point 82 such as to form two legs of a half bridge circuit 27.

The servo motor 52 illustrated in both FIGS. 1 and 3 may be of the induction variety which includes a squirrel cage rotor and a pair of quadrature windings 92 and 94. The center tap 82 is connected to the amplifier 50 so the output of the half bridge 27 is taken between the center tap 82 and ground. The remainder of the half bridge 27 includes two arms formed by connecting either end of the secondary winding 36 through respective impedance means illustrated as resistors 88 and 90 to ground. One of these resistors 90 is paralleled by the impedance pickoff 22 which includes a driven contact 20 and a follow-up contact 24. The driven contact 20 is illustrated as being driven through a mechanical linkage 102 by a force 100. The force 100 may, for example, be from a pressure transducer, accelerometer, etc. In similar manner, the follow-up contact 24 is connected to be re-positioned through a mechanical linkage 104 (which may be a gear train) by the servo motor 52.

The operation of this system using the half bridge 27 is substantially the same as that described in the system illustrated in FIG. 1. The primary difference between these systems lies in the half bridge 27 which eliminates the need for the additional resistors in the two arms of the bridge as is required in the embodiment illustrated in FIG. 1. The two arms of the bridge 88 and 90, 22, respectively, may have resistors of relatively low values such that the impedance pickoff 22 produces a null in the bridge output and hence operates in a relatively low impedance region of its pressure-resistance characteristics to a top value by the resistor 90. Because of the great similarity of operation between the embodiments of FIGS. 1 and 3, it is believed that no further explanation of the operation of the embodiment of FIG. 3 is required. The bridge circuit 26 provides an output voltage between the input of the amplifier 50 and ground having a phase and amplitude that varies as a function of the contact resistance of the impedance pickoff 22. Typically, the bridge 26 is balanced and has no output (at null) for some value of contact resistance below 1000 ohms (in a working model of this invention that has been constructed, the value of the contact resistance having a null value in the range of 10 ohms, has proven quite satisfactory and has provided the several advantages listed hereinbefore).

While the amplifier 50 may be a conventional servo amplifier of the type designed to receive an A.C. error signal from a bridge, an amplifier which has proven particularly suitable is illustrated in FIG. 4. The amplifier illustrated in FIG. 4 is a conventional temperature stabilized transistor amplifier and includes a single-ended front-end stage 110 and a push-pull power amplifier stage 12 which matches the split control winding of a typical size servo motor 11. The combination of the sensitive impedance pickoff 22 (FIGS. 1 and 3) with the matching amplifier of FIG. 4 reduces the "dead-band" of conventional servo systems and enables improved accuracy and sensitivity and decreased response time.

The single-ended front-end stage 110 includes an NPN transistor 114. One input from the bridge is connected through a matching transformer $T_1$ to the base electrode of the transistor 114. The collector electrode of the transistor 114 is connected through the primary winding 116 of a transformer 118, thence through a serially connected resistor 120 to a current source 122 (which may, for example, be a battery). The primary winding 116 is paralleled by a capacitor 124. Also, the current source 122 is connected through the resistor 120, thence to a voltage divider 126 to ground. A biasing RC circuit 128 is coupled between ground and the emitter electrode of the transistor 110. The voltage divider 126 paralled by a capacitor 130. The transformer 118 also has a center tapped secondary 132 which provides a push-pull input to the base electrodes of a pair of output transistors 134 and 136, respectively. The center tap of the secondary 132 is coupled through a diode 138 to ground and to each of the emitter electrodes of the transistors 134 and 136. The collector electrodes of each of the transistors 134 and 136 are coupled together through one of the windings 92 of the induction motor 52. The winding 92 has a center tap 140 that is connected to the current source 122. The winding 92 of the servo motor 52 is paralleled by a capacitor 142. In operation, the alternating phase or paraphase error signal from the bridge 26 (FIG. 1) is applied to the primary of the matching transformer $T_1$ which matches the low output impedance of the bridge to the higher impedance of the base of transistor 114. The voltage divider 126 and RC network 128 establish the bias point of this transistor. The error signal is amplified by the single-ended stage 110 and passes through the transformer 118 to drive the push-pull power amplifier stage 112. The primary 116 of the transformer 118 and the capacitor 124 form a tuned circuit to increase the gain of the single-ended stage 110. The current source 122 for the first stage 110 is isolated ("de-coupled") from the power amplifier stage 117 with the RC filter 120—130.

The output stage 112 is a push-pull class B amplifier, slightly forward biased by the diode 138. This diode 138 has the same temperature characteristics as the transistors 134, 136 and therefore temperature compensates them. The condenser 142 "tunes" the motor winding 92 to make it "look" resistive for the amplifier 112.

There has thus been described an improved servo transducer that utilizes a contact type position sensor. The contact type position sensor is employed in a bridge using relatively low impedances in its arms thereby to operate the contact sensor in the low impedance portion of its pressure-resistance characteristic. This mode of operation results in a more stable transducer with increased sensitivity and accuracy and reduced mass-loading of the element whose position is to be sensed.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:
1. In combination, an induction motor having a first phase winding and a second phase winding different from said first phase winding, first means for supplying an alternating current voltage to said first phase winding, second means for supplying a second alternating current voltage of said second phase to said second phase winding, said second means including an electronic amplifier and a phase shift circuit coupled to the input of said amplifier, said phase shift circuit including a pair of contacts having a contact displacement-resistance characteristic including a substantially linear low resistance region, impedance means connected across said contacts thereby to limit the resistance across said contacts to values within said region, and means for varying the pressure between said contacts.

2. The combination set forth in claim 1 wherein said second means includes a transformer having a primary winding connected to said means for supplying said first voltage, and a resistor serially connected with said primary winding and having a resistance value sufficiently large such that the current through said primary winding is substantially in phase with said first voltage thereby to eliminate the need for a phase shift circuitry in said first means.

3. The combination as set forth in claim 1 wherein said second means includes a transformer having a primary winding connected to said means for supplying said first voltage and a secondary winding, said phase shift circuit further comprising a second impedance connected in series with said impedance means across said secondary winding, and said amplifier being coupled to said phase shift circuit between the mid-point of said secondary winding and the point of connection between said impedance means and said second impedance.

4. In combination, an induction motor having a first phase winding and a second phase winding different from said first phase winding, first means for supplying an alternating current voltage to said first phase winding, second means for supplying a second alternating current voltage of said second phase to said second phase winding, said second means including an electronic amplifier and a phase shift circuit coupled to the input of said amplifier, said phase shift circuit including a bridge having four arms, each including an impedance means, one of said impedance means including a pair of contacting contacts having a contact pressure-resistance characteristic that includes a substantially linear low resistance region, and means for varying the pressure between said contacts, said impedance means each being selected such that said bridge assumes a balanced condition when said contact pressure is varied in said linear low resistance region, whereby said motor is accurately controlled by variation of said contact pressure.

5. The combination set forth in claim 4 which also includes an additional impedance means having a relatively low resistive value connected across said contacts.

6. In combination, an induction motor having first and second phase windings, first means for supplying a voltage to said first phase winding, second means coupled to said first means for supplying a voltage differing in phase from that of said first voltage to said second winding, said second means including a transformer having a secondary winding and a primary winding coupled to said first means, an amplifier having its input circuit coupled to said secondary winding and its output circuit coupled to said second phase winding, a phase shift circuit intermediate said amplifier and said secondary winding, said phase shift circuit including a pair of contacts having a contact displacement-resistance characteristic that includes a substantially linear low resistance region, said phase shift circuit having a relatively low impedance such that said phase shift circuit provides a null output when said contacts are operating in said linear low resistance region, and means including said induction motor coupled to position one of said contacts for maintaining the displacement between said contacts substantially constant.

7. The combination set forth in claim 6 which also includes an impedance means having a relatively low value connected across said contacts and wherein said means for positioning said one contact includes a mechanical linkage to indicate the movement of said motor required to maintain constant contact displacement thereby to accurately indicate contact displacement.

8. The combination set forth in claim 6 wherein said phase shift circuit comprises a balanced bridge circuit having four arms, a pair of input terminals connected to one pair of opposite junctions between said arms, and a pair of output terminals connected to the remaining pair of opposite junctions between said arms; one of said arms including said pair of contacts, said input terminals being connected to said transformer secondary, said output terminals being connected to the input of said amplifier.

9. The combination set forth in claim 8 which also includes an impedance means having a relatively low value connected across said contacts and whereby said contacts operate in the low impedance portion of their contact displacement-resistance characteristic thereby to improve the response of said motor to changes in contact displacement.

10. The combination set forth in claim 6 wherein said phase shift circuit includes a balanced bridge circuit wherein two arms of said bridge are comprised of said secondary winding center tapped and an additional two arms having relatively low values of impedance, one of said additional arms being paralleled by said contacts.

11. In a control system, an amplifier having an input circuit, a source of alternating current voltage for said input circuit, and a phase shift circuit intermediate said source of voltage and said input circuit, said phase shift circuit including a series arrangement of impedances connected across said source of voltage, one of said impedances being non-linearly variable between a substantially linear region of low impedance values and a region of substantially high values of impedance, and additional impedance means having a relatively low value connected across said one impedance thereby to limit the variations of said one impedance to values within said linear region of its characteristic, and means connecting said input circuit between a point intermediate said impedance and a point corresponding substantially to the midpoint of said source of voltage, thereby to provide a relatively low impedance phase shift circuit.

12. The system set forth in claim 11 wherein said one impedance means includes a pair of contacts.

13. The combination set forth in claim 12 wherein said phase shift circuit includes a balanced bridge circuit having four arms and a pair of input terminals connected to one pair of opposite junctions between said arms and a pair of output terminals connected to the remaining pair of opposite junctions between said arms, one of said arms including said contacts, said pair of input terminals being connected to said source of voltage, said pair of output terminals being connected to said input circuit.

References Cited in the file of this patent

UNITED STATES PATENTS

| | | |
|---|---|---|
| 2,389,939 | Sparrow | Nov. 27, 1945 |
| 2,505,258 | Robinette | Apr. 25, 1950 |
| 2,692,358 | Wild | Oct. 19, 1954 |